TIMER WITH REVERSIBLE MOTOR
Original Filed Sept. 26, 1961 2 Sheets-Sheet 1
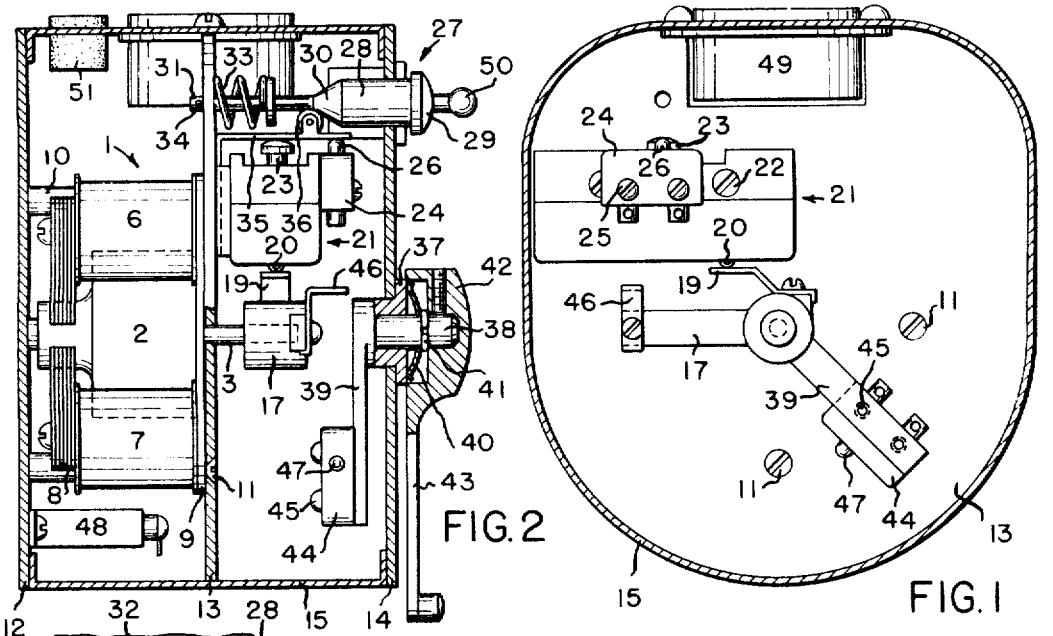
FIG. 2
FIG. 1
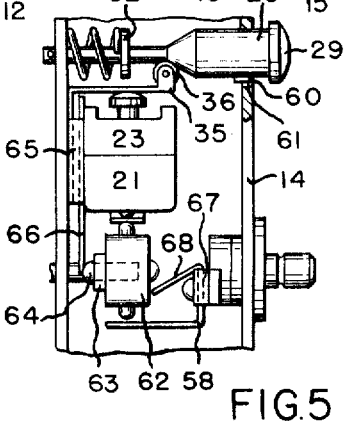
FIG. 5
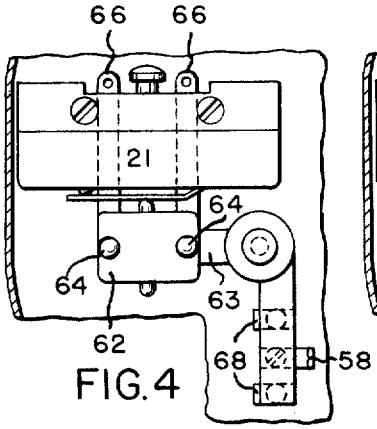
FIG. 4
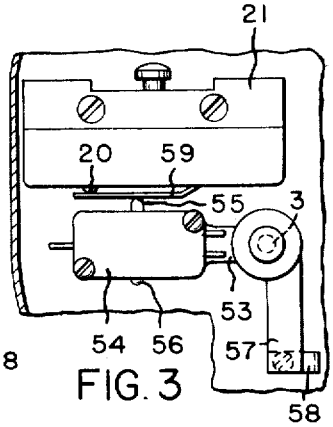
FIG. 3
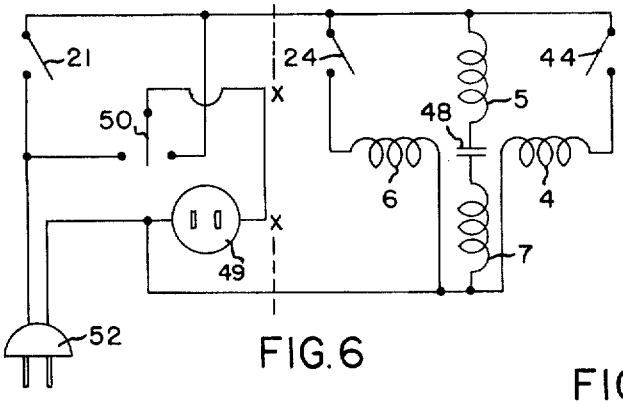
FIG. 6
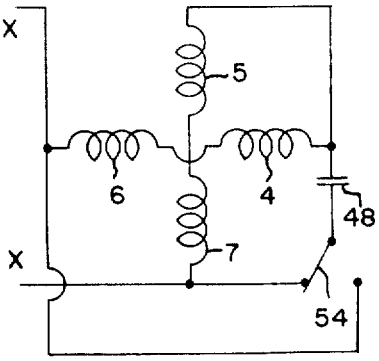
FIG. 7
INVENTOR
Charles Swenson

TIMER WITH REVERSIBLE MOTOR

Original Filed Sept. 26, 1961 2 Sheets-Sheet 2

INVENTOR
Charles Swenson

United States Patent Office

Re. 26,118
Reissued Nov. 29, 1966

26,118
TIMER WITH REVERSIBLE MOTOR

Charles Swenson, P.O. Box 83, Madison Square Station, New York, N.Y.

Original No. 3,087,103, dated Apr. 23, 1963, Ser. No. 140,720, Sept. 26, 1961. Application for reissue May 21, 1964, Ser. No. 380,726
17 Claims. (Cl. 318—265)

Matter enclosed in heavy brackets [ ] appears in the original patent but forms no part of this reissue specification; matter printed in italics indicates the additions made by reissue.

My invention relates to improvements in electric timers, in which a motor running at constant speed controls energizing [at] *of* electro receptive devices, as well as to such timers wherein the motor itself supplies motive power to machines while timing their operation.

This application is a continuation-in-part of my application Serial No. 842,745, filed September 28, 1959, now abandoned.

It is an object of my improvements to provide a reliable and versatile interval timer without using a great many different component parts as in existing devices of this kind, but so use instead a reversible motor combined with a minimum number of readily available parts comprising: a motor driven member, a member for setting on a dial at varying distances from the starting position of the motor driven member, together with switches to start the motor in one direction, to reverse the direction when the motor driven member meets the setting member, and so finally turn off the motor, when the motor driven member returns to the starting position.

While I believe my improvements may be useful in other fields, as already stated, I have illustrated in the accompanying drawings an interval timer designed in accordance with my invention with an eye on photography to control the duration of operation of external appliances such as lamps within a range of 1 minute, the dial being graduated in seconds from 1 to 60.

While continuous cycle repeating may be effected by a twist of the starting button, it is also an object of my improvements to provide a cycle repeating mechanism for the simple timer to automatically extend the controlled running time of the motor corresponding to the reading on the dial multiplied by factors for example 2–30, as in an illustrated case, thereby increasing the capacity of the timer in this case to measure intervals from 1 second to ½ hour.

Other objects and advantages of my improvements will appear with the reading of the specification.

Figure 13:
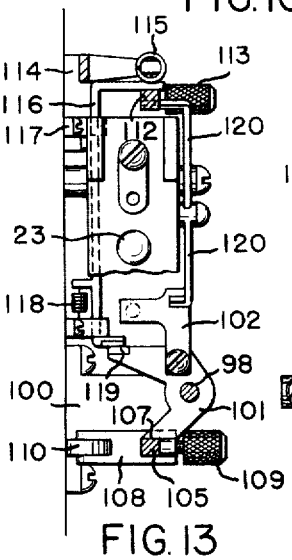
Figure 12:
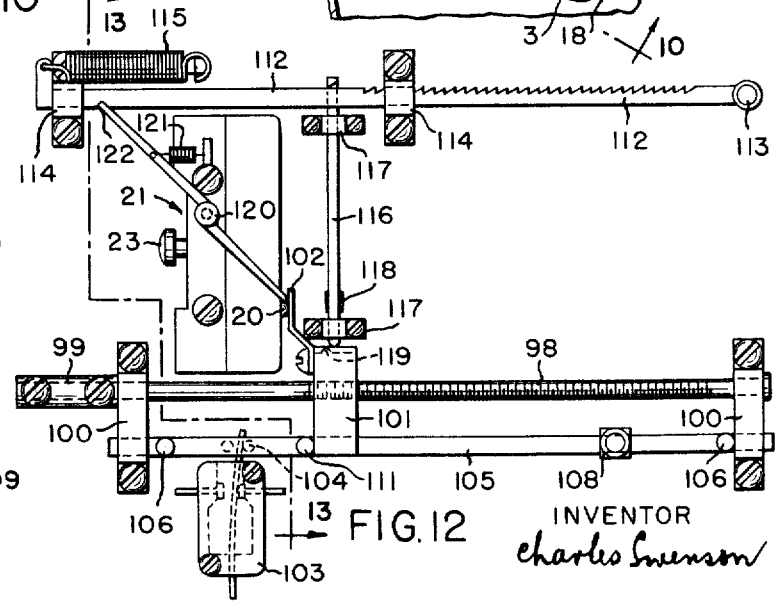

Several simple embodiments of the timer have been illustrated differing mainly in the type of switch used to determine the running direction of the motor and the electrical circuit. One embodiment (FIGS. 1 and 2) employs two momentary, normally open switches, one of which is shown is stationary, but may also be carried by the motor driven member, while the other is carried by the setting member as shown[,] ; in FIGS. 4 and 5, only one momentary, normally open switch is used to reverse the motor while running in either direction; in another simple embodiment a single pole double throw switch is carried by the motor driven member (FIG. 3), but may also be stationary as shown in FIGS. 12 and 13.

Figure 11:
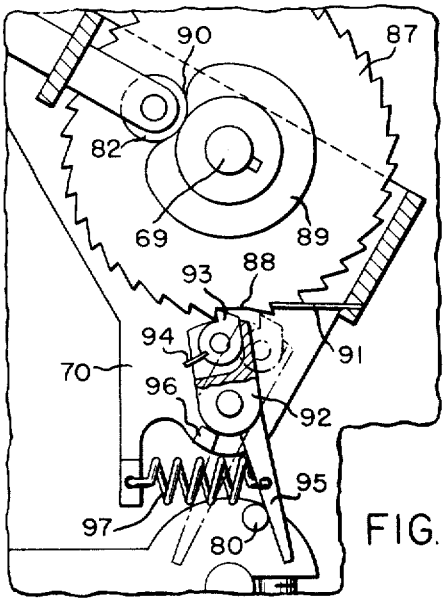
Figure 8:
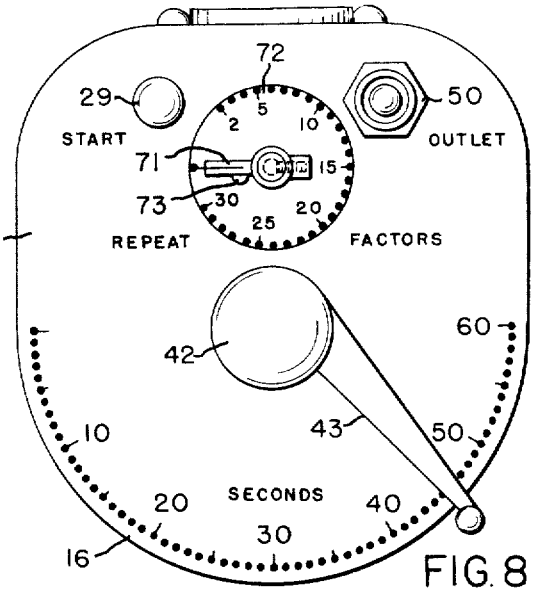
Figure 9:
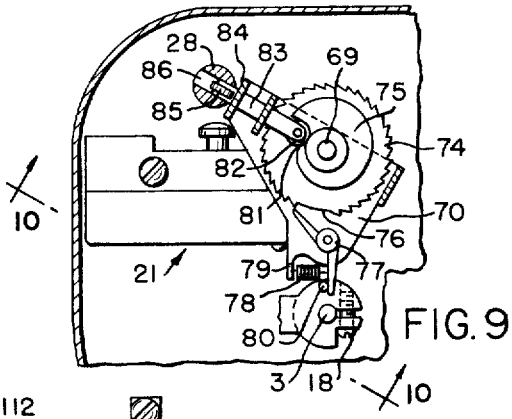

In the drawings FIG. 1 is a top view of the timer with the upper part removed; FIG. 2 is a side view thereof partly in section showning the entire mechanism including the motor; FIGS. 3 and 4 are top views of part of the mechanism, and FIG. 5 is a side view of FIG. 4; FIGS. 6 and 7 are circuit diagrams, FIG. 7 to be read with the portion of FIG. 6 to the left of the letters x; FIG. 8 is a top view of the timer with cycle repeating mechanism; FIG. 9 is a top view of the cycle repeating mechanism taken substantially on the plane 9—9 in FIG. 10, and FIG. 10 a side view thereof on the plane 10—10 in FIG. 9; FIG. 11 is an enlarged view of a modified cycle repeating mechanism; FIG. 12 shows another modification of the timer and cycle repeating mechanism, and FIG. 13 is a side view of FIG. 12.

The same numerals refer to the same parts in all the views.

Describing first the simple embodiment shown in FIGS. 1 and 2, an alternating current 1 r.p.m. motor 1 with gear box 2, output shaft 3, coils 4, 5, 6, 7 and four pole pieces 8 is suspended by its [case] *base* 9 on four spacers 10 and fastened with screws 11 between a bottom plate 12 and a mounting plate 13; a dial plate 14 is fastened to an enclosing wall 15, the latter being in turn mounted on the bottom plate, all plates 12, 14 are of the same shape with a semi-circular part, the center of which marks the axis of the motor, and the motor output shaft 3 extends upward through the mounting plate 13. The dial plate 14 is provided with a dial 16 (FIG. 8) graduated in seconds from 1–60 along the periphery of its semi-circular part. A "motor arm" 17 is secured to the motor output shaft by a screw 18 passed through a split hub section (FIG. 9) and carries a leaf spring 19 to act on a push button 20 on a main switch 21 to turn off the latter, when the motor arm is in the starting position, in which it is shown in the drawing. The main switch is a single pole single throw micro switch with a capacity to handle current consumed by the external appliances to be placed in parallel circuit with the motor; it is secured to the mounting plate 13 with screws 22 and has two push buttons 20, 23 protruding from opposite sides of the switch casing, whereby the switch may be turned off and on respectively by a light pressure, one push button being in, when the other is out and vice versa. A smaller second switch 24 is fastened on the main switch with screws 25, its push button 26 aligned vertically with the "on" push button 23 on the main switch. The switch 24 is a momentary, normally open micro switch that, when actuated simultaneously with the main switch, will start the motor in a direction to move the motor arm away from its starting position. A switch actuator 27 has a cylindrical part 28 extending upward through the dial plate 14 and ending in a starting button 29, a conical part 30 and a cylindrical part 31 of reduced diameter, the latter provided with a flange 32 and extending downward through the mounting plate 13. The actuator 27 is urged upward by a coil spring 33 acting between the plate 13 and flange 32, the movement being limited by a pin 34 passed through its lower end. A leaf spring 35 is held under the main switch to touch with one side the push buttons 23, 26 of the main switch 21 and the momentary switch 24 respectively and provided with a roller 36 extending from the other side and placed at tangent to the conical part 30 of the actuator 27. When a momentary pressure is applied to the starting button 29, the two switches 21, 24 will be actuated together causing instant start of the motor; the momentary switch returns at once to its normal off condition, while the main switch remains closed until opened by the leaf spring 19, when the motor arm returns to the starting position. A bushing 37 is provided centrally in the dial plate 14 as a bearing for a stud 38 of a "setting arm" 39, which is held in place and under suitable tension by means of spring washer 40 and a retaining ring 41; the stud 38 extends upward through the bushing 37, above which a pointer 42 is attached with a set screw; the pointer is adapted for manual rotation over the dial 16 and for setting thereon having a radial index edge 43. A third switch 44 identical with the switch 24 is attached to the underside of the setting arm 39 by screws 45, and an upright actuator 46 is fixed on the motor arm to meet the push button 47 on the switch 44 and cause instant reversal of the motor and completion of the cycle after the exact time period indicated by the pointer 42 on the dial 16. A phase splitting capacitor 48 is mounted on the bottom plate 12 to be included in the circuit; also included is a receptacle 49 for external appliances, which may be turned on or off independently of the motor or placed in parallel circuit therewith by means of a toggle switch 50 mounted on the dial plate 14. The receptacle is in the wall 15 together with a grummet 51 for an electric cord (not shown) with plug 52 for A.C. 60 c. line outlets. The electrical circuit for this embodiment may be conveniently followed in FIG. 6 wherein, as in the diagram in FIG. 7 the symbols are given the same reference numerals as the parts they represent.

Turning now to the simple embodiment illustrated in FIG. 3 with electrical diagram in FIG. 7 it is only necessary to point out, how it differs in construction and function from that already described. A motor arm 53 is fastened to the motor output shaft 3 in the same manner as the mtor arm 17, it carries a single pole double throw microswitch 54 with a pushbutton 55, 56 protruding substantially in the direction of rotation from opposite sides of the switch casing. Depression by a light touch of a pushbutton throws the switch and determines the direction of rotation of the motor arm 53 respectively toward and away from a setting arm 57, one pushbutton being in, when the other is out and vice versa. The setting arm 57 is practically similar to the setting arm 39, but carries an upright actuator 58 to meet the pushbutton 56 and throw the switch 54, so as to cause instant reversal of the motor and return of the motor arm to the starting position. A leaf spring 59 is furnished on the main switch 21 to touch its "off" pushbutton 20 and may be bent to facilitate opening of the switch, it is designed to meet the pushbutton 55 on the switch 54 and to open the main switch, as the motor arm returns to the starting position. Conversely closing of the main switch will cause the spring 59 to throw the switch 54 and start the cycle. The cylindrical part 28 of the switch actuator 27 is provided with a key 60, and the dial plate 14 with a keyway 61, whereby continuous running of the motor may be effected by a twist of the starting button 29, as the motor arm oscillates between its starting position and the setting arm 57, until the actuator is released.

If the current carrying capacity of the double throw switch 54 permits, an extra receptacle may be connected between the condenser 48 and either side of the plug 52 (FIG. 7) [so] *to* energise external appliances during one selected half of the cycle. By rewiring the toggle switch 50 the same result may be obtained with the receptacle 49 in addition to the full cycle energizing of the appliances.

In the construction just described two momentary, normally open microswitches may be carried by the motor arm for example in a common case like that of the switch 54 and connected in accordance with FIG. 6 or FIG. 7. While the double throw switch 54 must remain in the circuit during the entire running time of the motor, the momentary switches need only be connected at the start and reversal of the motor. In FIGS. 4 and 5 is illustrated an arrangement, whereby only one momentary switch is used, and carrying of wires by the motor arm is avoided. A momentary, normally open microswitch 62 is held to a part 63 of insulating material of a motor arm by rivets 64, and a strip 65 of insulating material with two spaced apart flexible contact members 66 extending toward the motor arm is held under the main switch 21, so that electrical contact is made with the rivets, as the motor arm nears the starting position. Likewise a strip 67 of insulating material with a pair of flexible contact members 68 is carried by the setting arm to contact the rivets 64, as the motor arm meets the setting arm. The rivets are connected to the switch terminals and the contact members to other electrical components to obtain the desired circuit.

[Cycle Repeating]

Figure 10:
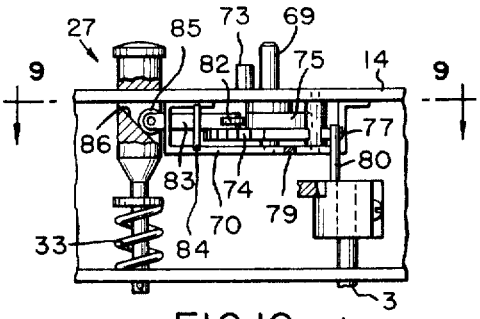

The cycle repeating mechanism illustrated in FIGS. 8–10 and now to be described may be equally well installed in all the simple embodiments of the timer, except where the momentary switch 24 is stationary and in the position shown in FIGS. 1 and 2, in which case an extra momentary switch is needed as described in my formally abandoned application Ser. No. 773,767, filed November 13, 1958.

The cycle repeating mechanism includes a vertical operating shaft 69 with a bearing in a bracket 70, which is fastened to the underside of the dial plate 14 forming with the latter a housing for the mechanism. The shaft 69 extends upward through the dial plate and has a knob or pointer 71 attached to its extreme end by means of a set screw. A dial 72 concentric with the operating shaft is provided on the plate 14 and has equidistant graduations numbered clockwise from 2–30 to indicate cycle repeating factors by means of the pointer, and a stop 73 limits movement of the pointer to the factor 30 on the dial. A ratchet wheel 74 and a spiral cam 75 are fastened together and keyed on the shaft 69, and a number of teeth have been removed from the ratchet wheel leaving a cylindrical space 76 clear of teeth. A pawl 77 turning in the dial plate and the bracket 70 is biased by a light coil spring 78 held by an arm 79 of the bracket 70 to follow the teeth of the ratchet wheel and permit clockwise rotation thereof, but prevent rotation in the other direction. A pin 80 is fixed upright in the motor arm and acts on the pawl 77 to barely clear the teeth, when the motor arm is in the starting position; when the motor arm is in motion, and the cycle repeating mechanism inoperative, the pawl will rest on the body [at] *of* the ratchet wheel in the tooth free space 76. The cam 75 is provided at the inner end of its spiral rim with a recess 81, wherein rests a roller 82, when the cycle repeating mechanism is inoperative. The roller 82 is carried in one end of a square rod 83, which slides in guides 84, part of the bracket 70, and carries in the other end a similar roller 85, which is in contact with an inclined surface 86 cut in the switch actuator 27. If the knob 71 is rotated clockwise, the roller 82 leaves the recess 81 and follows the spiral curvature of the cam 75, while the roller 85 will bear against the surface 86 and depress the actuator 27, thereby starting the motor. Conversely the upward force exerted by the spring 33 on the actuator will be transmitted to the spiral cam 75 to bias the latter for counter clockwise rotation; if the knob 71 is set on a certain factor on the dial 72, the corresponding tooth, counting from the tooth free space 76, will be engaged by the pawl 77. When the motor arm returns to the starting position, the main switch cannot be turned off, instead the second switch (24, 54 or 62 as the case may be) is actuated, causing instant reversal of the motor and start of a new cycle, while the pin 80 acts on the pawl 77 to release a tooth on the ratchet wheel and engage the next one, these actions being repeated until the mechanism has returned to the inoperative position.

The cycle repeating mechanism is best used to measure intervals over 1 minute. The time is expressed in seconds, and the number taken as the product of two convenient factors, one of which preferably the larger is used for setting on the main dial 16. The knob 71 is then turned to the other factor on the dial 72 to start the timer.

The modified cycle repeating mechanism shown in FIG. 11 is used with the simple embodiments of the timer like the mechanism described above. In FIG. 11 a ratchet wheel 87 with a tooth removed at 88 and a circular cam 89 with a recess 90 for the roller 82 are keyed together on the rotary operating shaft 69, counterclockwise rotation of the shaft being prevented by a leaf spring 91 fixed in the bracket 70 and acting against radial faces of the ratchet teeth. A lever 92 for turning the ratchet wheel a limited angle has bearings in the bracket 70 and the dial plate 14, one arm of the lever 92 forming a housing for a pivoted tongue 93 provided with a light leaf spring 94 to act against an inner surface of the housing to turn the tongue into position for engagement with the ratchet wheel. The other lever arm 95 is engaged by the pin 80 carried on the motor arm, when the latter is in or near its starting position and rests, when out of engagement with the pin against a stop 96 on the bracket 70, toward which position it is biased by a coil spring 97 held by the bracket. The motor arm is shown in the starting position, and the cycle repeating mechanism is in the inoperative position. When the operating shaft is rotated into a desired position, the movement of the roller 82 out of the recess 90 in the cam 89 will cause closing of the main switch 21, and the switch cannot be turned off, as long as the roller is on the circular rim of the cam. As the motor starts, the pin 80 leaves the position shown and is followed up by the lever arm 95 as far as the stop 96, while the tongue 93 turns on its pivot to clear the ratchet teeth, the lever 92 now being in the position indicated by the dotted lines. When the motor arm returns to its starting position, the pin 80 again engages the arm 95 and replaces the lever into its original position, while the tongue 93 advances the ratchet wheel one pitch clockwise, this action being repeated until the roller 82 enters the recess 90. The tooth is removed from the ratchet wheel, so that the main switch may be closed for single cycle timing without operating the cycle repeating mechanism.

In FIGS. 12 and 13 a rod 98 for coupling to the output shaft of a motor (not shown) by means of a sleeve 99 has bearings in two supports 100, between which it is screw threaded for a member 101 adapted for axial movement on the rod, as the latter rotates. The motor driven member 101 carries a leaf spring 102 to act on the push button 20 on the main switch 21 to turn off the switch in the starting position of the motor driven member, in which position it is shown. A stationary single pole double throw switch 103 has its operating member placed between two pins 104 on a switch actuator 105, which is movable lengthwise in the supports 100, the movement being limited by stops 106 to that required to throw the switch, and one end of the motor driven member is suitably cut at 107 so as to be guided in its movement by the actuator. A member 108 slides on the actuator for setting thereon at any distance from the starting position of the motor driven member by means of a set screw 109 and is provided with a roller 110 on its lower end to facilitate its movement and prevent sagging of the actuator. The electrical connection in FIG. 7 is used so that when the main switch 21 is closed by depressing its push button 23, the motor driven member first moves against a pin 111 on the actuator 105 and, as the spring 102 bends, throws the switch 103 for reversal and then moves toward the setting member 108, where the switch is thrown again, and the motor driven member returns to the starting position opening the main switch. If desired the motor may be reversed at any time while running by manual action on the setting member 108 to throw the switch 103.

The cycle repeating mechanism consists of an operating member 112 of rectangular cross section supported for lengthwise movement by means of a handle 113 in two brackets 114 and biased toward the position shown, in which the cycle repeating mechanism is inoperative, by an extension spring 115, the operating member 112 is provided with ratchet teeth for a pawl 116 sliding in two brackets 117 and biased to engage the teeth by a light coil spring 118, so that the member 112 may be latched in a number of positions to operate the mechanism, and the timer is started by closing the main switch. In the inoperative or zero position of the cycle repeating mechanism the pawl 116 barely clears a [slight protuberance] *salient point* 119 on the motor driven member 101, as the latter passes in its movement on the threaded rod 98 however, when the pawl 116 engages a ratchet tooth, it is in the way and will be displaced in passing of the motor driven member, thereby releasing the operating member 112, which takes the next position closer to the zero position. A lever 120 pivoted on the main switch 21 has one arm urged by a light coil spring 121 into a notch 122 in the operating members, when the latter is in the zero position, while the other arm lies behind the spring 102 without interfering with opening of the main switch, but out of the notch the lever prevents opening of the switch, and the motor driven members, when returning to the starting position, will throw the switch 103 for reversal and start a new cycle.

The momentary or double throw reversing switch and each type of cycle repeating mechanism described may be used substantially in the same manner in combination with a straight moving motor driven member as with a rotating member (motor arm).

Two single throw switches with their operating members connected, so that one switch is on, when the other is off and vice versa, may be used in place of the double throw switch and are considered to be its equivalent.

While I have described several embodiments of my improvements, it is understood, that changes may be made therein within the spirit of the invention and scope of the following claims:

1. In a timing device: an electrically reversible motor responsive to a momentary circuit change by start in one direction or the other and reversal of direction while running in either direction; a member driven by said motor and adapted for limited movement *substantially* at constant-speed from a starting position; a member for setting in the path of said motor driven member at varying distances from said starting position; a main first switch to selectively energize and deenergize the motor circuit, a momentary, normally open second switch, and a momentary normally open third switch connected in the circuit to effect by momentary closing aforesaid circuit change and thereby determine the direction of movement of the motor driven member; actuating means to close said main switch and momentarily close said second switch in the starting position of the motor driven member for movement thereof toward the setting member; means applying said movement to momentarily close said third switch for reversal of the motor at a position determined by the setting member, and means opening the main switch upon return to the starting position of the motor driven member.

2. In a timing device according to claim 1, releasable means to prevent opening of the main switch and effect automatic actuation of the second switch to reverse the motor and start a new cycle, as the motor driven member returns to the starting position.

3. In a timing device according to claim 1, means applying the inertia of the motor driven member to close said momentary second switch in the starting position after opening of the main switch, and until the latter switch is again closed.

4. A timing device in accordance with claim 1, wherein only one momentary, normally open switch is used, including means adapting said switch for actuation to run the motor in either direction, and means disconnecting the switch from the circuit between actuations.

5. In a timing device according to claim 4, releasable means to prevent opening of the main switch and effect automatic actuation of the momentary switch to reverse the motor and start a new cycle, as the motor driven member returns to the starting position.

6. In a timing device according to claim 4, means applying the inertia of the motor driven member to close said momentary switch in the starting position after opening of the main switch, and until the latter switch is again closed.

7. In a timing device: an electrically reversible motor responsive to a circuit change by start in one direction or the other and reversal of direction while running in either direction; a member driven by said motor and adapted for limited movement *substantially* at constant speed from a starting position; a member for setting in the path of said motor driven member at varying distances from said starting position; a main first switch to selectively energize and deenergize the motor circuit; a double throw second switch connected in the circuit to effect when thrown aforesaid circuit change and thereby determine the direction of movement of said motor driven member; actuating means to close said main switch and throw said second switch in the starting position of the motor driven member for movement thereof toward the setting member; means applying said movement to throw the second switch for reversal at a position determined by the setting member, and means opening the main switch upon return to the starting position of the motor driven member.

8. In a timing device according to claim 7, releasable means to prevent opening of the main switch and effect automatic throwing of the second switch to reverse the motor and start a new cycle, as the motor driven member returns to the starting position.

9. In a timing device according to claim 7, means applying the inertia of the motor driven member to throw the second switch in the starting position after opening of the main switch for movement toward the setting member of the motor driven member, when the main switch is again closed.

10. In a timing device according to claim 7, means throwing the second switch in the starting position for movement of the motor driven member toward the setting member by movement away from the setting member.

[11. In a timing device: an electrically reversible motor; a member adapted for movement at constant speed transmitted by said motor in opposite directions between a starting position and a terminal position; a main switch to selectively open and close the motor circuit; reversing switch means connected in the circuit and adapted for actuation in said starting position to start the motor and in either aforesaid position by approaching movement of the motor driven member to reverse the motor while running; a cycle repeating control mechanism including: an operating member biased toward a zero position, in which said mechanism is inoperative; means to indicate cycle repeating factors; means for latching the operating member in positions corresponding to said factors; means to prevent opening of the main switch, while the operating member is away from the zero position, and means associated with the motion driven member, acting within consecutive cycles, to release the operating member and cause it to take the position corresponding to the next lower factor, until it has returned to the zero position.]

12. In a timing device: an electrically reversible motor; a member adapted for movement *substantially* at constant speed transmitted by said motor in opposite directions between a starting position and a terminal position; a main switch to selectively open and close the motor circuit; reversing switch means connected in the circuit and adapted for actuation in said starting position to start the motor and in either aforesaid position by approaching movement of the motor driven member to reverse the motor while running; a cycle repeating control mechanism including: an operating member having a zero position, in which said mechanism is inoperative; means for setting the operating member in a plurality of positions; means to prevent opening of the main switch, while the operating member is away from the zero position, and means associated with the motor driven member, acting at regular intervals, to cause the operating member to take a position closer to the zero position, until it has returned to that position.

[13. A timing device according to claim 11, wherein the cycle to be repeated is of variable duration, said terminal position being determined by a member adapted for setting in the path of the motor driven member and at varying distances from the starting position.]

14. A timing device according to claim 12, wherein the cycle to be repeated is of variable duration, said terminal position being determined by a member adapted for setting in the path of the motor driven member and at varying distances from the starting position.

[15. In a timing device according to claim 11, means to automatically close the main switch, when the operating member is displaced from the zero position.]

16. In a timing device according to claim 12, means to automatically close the main switch, when the operating member is displaced from the zero position.

[17. In a timing device according to claim 13, means to automatically close the main switch, when the operating member is displaced from the zero position.]

18. In a timing device according to claim 14, means to automatically close the main switch, when the operating member is displaced from the zero position.

[19. In a timing device: an electrically reversible motor responsive to a momentary circuit change by start in one direction or the other and reversal of direction while running in either direction; a member driven by said motor and adapted for movement at constant speed between a starting position and a terminal position; a member for setting in the path of said motor driven member at varying distances from the starting position to determine said terminal position; means to selectively energize and deenergise the motor circuit, and secondary contact means to make said momentary circuit change in the starting position to start the motor and in either aforesaid position by approaching movement of the motor driven member to reverse the motor while running.]

*20. In an interval timer: an electrically reversible motor; a member driven by said motor and adapted for movement substantially at constant speed between a starting position and a terminal position; a member in the path of said motor driven member to determine said terminal position; a main first switch to open and close the motor circuit; a normally open momentary second switch carried by the motor driven member and connected in the circuit to start the motor and to reverse the motor in aforesaid positions by approaching movement of the motor driven member; means disconnecting said latter switch from the circuit between the actuations of the switch and means to energize a load circuit in parallel with the motor circuit while the motor is running.*

*21. In an interval timer: an electrically reversible motor; a member driven by said motor and adapted for movement substantially at constant speed between a starting position and a terminal position; a member in the path of said motor driven member to determine said terminal position; a main first switch to open and close the motor circuit; a normally open momentary second switch and a normally open momentary third switch in the circuit to start the motor and to reverse the motor in aforesaid positions by approaching movement of the mo-*

*tor driven member, and means to energize a load circuit in parallel with the motor circuit while the motor is running.*

*22. In an interval timer: an electrically reversible motor; a member driven by said motor and adapted for movement substantially at constant speed between a starting position and a terminal position; a member in the path of said motor driven member to determine said terminal position; a main first switch to open and close the motor circuit; a double throw second switch in the circuit to reverse the motor in aforesaid positions by approaching movement of the motor driven member, and means to energize a load circuit in parallel with the motor circuit while the motor is running.*

References Cited by the Examiner

The following references, cited by the Examiner, are of record in the patented file of this patent or the original patent.

UNITED STATES PATENTS

| | | | |
|---|---|---|---|
| 2,424,859 | 7/1947 | Shoemaker | 318—282 |
| 2,726,358 | 12/1955 | Barnhart | 318—282 |
| 2,991,403 | 7/1961 | Groft | 318—467 |

ORIS L. RADER, *Primary Examiner.*

C. E. ROHRER, G. Z. RUBINSON, *Assistant Examiners.*